United States Patent
Yoshikawa et al.

(10) Patent No.: US 9,648,647 B2
(45) Date of Patent: May 9, 2017

(54) BASE STATION AND COMMUNICATION CONTROL METHOD

(71) Applicant: NTT DOCOMO, INC., Chiyoda-ku (JP)

(72) Inventors: Tomoyasu Yoshikawa, Chiyoda-ku (JP); Yoshikazu Goto, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/768,289

(22) PCT Filed: Mar. 27, 2014

(86) PCT No.: PCT/JP2014/058886
§ 371 (c)(1),
(2) Date: Aug. 17, 2015

(87) PCT Pub. No.: WO2014/174979
PCT Pub. Date: Oct. 30, 2014

(65) Prior Publication Data
US 2016/0014822 A1    Jan. 14, 2016

(30) Foreign Application Priority Data

Apr. 26, 2013    (JP) ................................. 2013-093859

(51) Int. Cl.
*H04W 4/00* (2009.01)
*H04W 76/02* (2009.01)
*H04L 12/931* (2013.01)

(52) U.S. Cl.
CPC ............. *H04W 76/02* (2013.01); *H04L 49/20* (2013.01); *H04W 76/026* (2013.01)

(58) Field of Classification Search
CPC ... H04L 49/20; H04L 63/0435; H04L 63/062; H04L 63/0876; H04L 63/18;
(Continued)

(56) References Cited

U.S. PATENT DOCUMENTS

| 2011/0213958 A1* | 9/2011 | Lindholm | H04L 63/18 713/153 |
| 2012/0069750 A1* | 3/2012 | Xing | H04W 72/0486 370/252 |
| 2014/0119209 A1* | 5/2014 | Joul | H04W 36/0022 370/252 |

FOREIGN PATENT DOCUMENTS

| JP | 8-186862 A | 7/1996 |
| JP | 2004-282168 A | 10/2004 |
| JP | 2011-205403 | 10/2011 |

OTHER PUBLICATIONS

JP Office Action issued Jul. 14, 2015 in JP Application No. 2013-093859 (with English-language translation).
(Continued)

*Primary Examiner* — Timothy Pham
(74) *Attorney, Agent, or Firm* — Oblon, McClelland, Maier & Neustadt, L.L.P.

(57) ABSTRACT

In one aspect of the present invention, a base station includes a reception unit configured to receive a call request or a paging response according to circuit switching from a mobile station; a packet switched communication state determination unit configured to determine a state of packet switched communication of the mobile station, when the call request or the paging response is received from the mobile station; and a circuit switching communication processing unit configured to establish a circuit switched bearer using a radio parameter for circuit switched communication, when no packet switched communication is performed in the mobile station.

7 Claims, 4 Drawing Sheets

(58) Field of Classification Search
CPC .... H04L 65/1016; H04W 76/02; H04W 76/026; H04W 12/02; H04W 12/04; H04W 36/0022
See application file for complete search history.

(56) References Cited

OTHER PUBLICATIONS

International Search Report issued Jul. 1, 2014 in PCT/JP2014/058886 filed Mar. 27, 2014.

\* cited by examiner

BASE STATION AND COMMUNICATION CONTROL METHOD

TECHNICAL FIELD

The present invention relates to a base station and a communication control method.

BACKGROUND ART

In a WCDMA (Wideband Code Division Multiple Access) radio communication system, a mobile station can simultaneously perform voice communication according to circuit switching and data communication according to packet switching. Some mobile stations are connected to a network to always transmit and receive data for them. These mobile stations are referred to as "always-connected terminals".

An always-connected terminal may maintain a radio link even though no packet communication occurs. This radio link is referred to as a "PS (Packet Switched) bearer". When a voice call is originated or received in this situation, a voice bearer is added and consequently a multi-call condition is raised. The voice bearer is referred to as a "CS (Circuit Switched) bearer". In a multi-call condition, both radio resources for a PS bearer and radio resources for a CS bearer are consumed.

In order to reduce waste of radio resources, it is assumed that a PS bearer is released according to CSFB (Circuit Switched FallBack) for switching from a LTE (Long Term Evolution) network to a 3G network when a voice call is originated or received (see Japanese Patent Laid-Open Publication No. 2011-205403).

DISCLOSURE OF INVENTION

Problem(s) to be Solved by the Invention

As described above, both radio resources for a PS bearer and radio resources for a CS bearer are consumed in a multi-call condition, and thus radio resources are wasted when no packet communication is actually performed. For example, even if there are no data for packet communication, transmission power and a channelization code to satisfy a target signal power to interference power ratio (Target_SIR) for multi-calls should be used. Thus, even if only voice communication is performed, an excessive amount of transmission power is used in a mobile station and a channelization code is wasted in a base station.

It is a general object of the present invention to save radio resources in a multi-call condition when no packet communication is performed.

Means for Solving the Problem(s)

In one aspect of the present invention, there is provided a base station, including:

a reception unit configured to receive a call request or a paging response according to circuit switching from a mobile station;

a packet switched communication state determination unit configured to determine a state of packet switched communication of the mobile station, when the call request or the paging response is received from the mobile station; and a circuit switching communication processing unit configured to establish a circuit switched bearer using a radio parameter for circuit switched communication, when no packet switched communication is performed in the mobile station.

In another aspect of the present invention, there is provided a communication control method in a base station, including the steps of:

receiving a call request or a paging response according to circuit switching from a mobile station;

determining a state of packet switched communication of the mobile station, when the call request or the paging response is received from the mobile station; and establishing a circuit switched bearer using a radio parameter for circuit switched communication, when no packet switched communication is performed in the mobile station.

Advantageous Effect of the Invention

According to the present invention, it is possible to save radio resources in a multi-call condition.

DETAILED DESCRIPTION OF THE PREFERRED EMBODIMENTS

Embodiments of the present invention are described below with reference to the accompanying drawings.

In an embodiment of the present invention, a radio communication system is described which can simultaneously support voice communication according to circuit switching and data communication according to packet switching. A base station in this system determines a state of packet switched communication of a mobile station when a voice call is originated or received. When no packet switched communication is performed, the base station uses a radio parameter (for example, Target_SIR) corresponding to a single bearer for circuit switched communication rather than a radio parameter for multi-calls. As a result, it is possible to save radio resources when no packet switched communication is performed and only voice communication according to circuit switching is performed.

<Configurations of a Radio Communication System and a Base Station>

Figure 1:
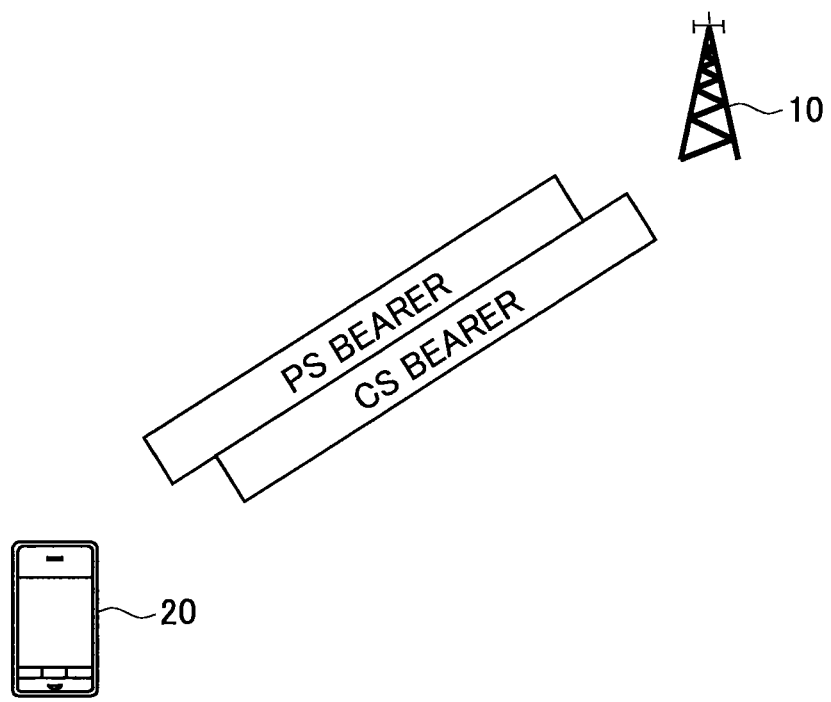
FIG. 1 shows a schematic diagram of a radio communication system in accordance with an embodiment of the present invention.

FIG. 1 shows a schematic diagram of a radio communication system in accordance with an embodiment of the present invention.

A radio communication system in accordance with an embodiment of the present invention is a radio communication system such as a WCDMA system, which can simultaneously support voice communication according to circuit switching and data communication according to packet switching. The radio communication system includes a base station 10 and one or more mobile stations 20. The mobile station 20 may be any appropriate user device with a radio communication capability, such as a mobile phone or a smartphone.

The base station 10 transmits to the mobile station 20 downlink (DL) data received from a connected upper layer station or a server (not shown) and transmits to the upper layer station (not shown) uplink (UL) data received from the mobile station 20.

When the mobile station 20 performs data communication with the base station 20 according to packet switching, a radio link called a PS (Packet switched) bearer is established between the base station 10 and the mobile station 20. When the mobile station is an always-connected terminal, a PS bearer may be maintained even if no packet communication is performed.

When the mobile station 20 performs voice communication with the base station 10 according to circuit switching, a radio link called a CS (Circuit Switched) bearer is established between the base station 10 and the mobile station 20. The CS bearer is added upon a call request or a paging response (call response) for voice communication from the mobile station 20 and is deleted upon the completion of the voice communication.

When a voice call is originated or received while a PS bearer is maintained, a multi-call condition is raised in which both the PS bearer and a CS bearer are established between the base station 10 and the mobile station 20. In an embodiment of the present invention, when no packet switched communication is performed in this condition, the base station 10 uses a radio parameter (for example, Target_SIR) corresponding to a single bearer for circuit switched communication rather than a radio parameter for multi-calls. The radio parameter for multi-calls and the radio parameter corresponding to a single bearer may be stored in the base station 10. For example, the radio parameter corresponding to a single bearer is a Target_SIR for a voice codec, AMR (Adaptive Multi-Rate). Since the Target_SIR for multi-calls is smaller than the target_SIR corresponding to a single bearer, it is possible to save battery energy due to reduction of transmission power in the mobile station 20, to stabilize uplink quality due to reduction of uplink interference, and to save a channelization code in the base station 10.

Figure 2:
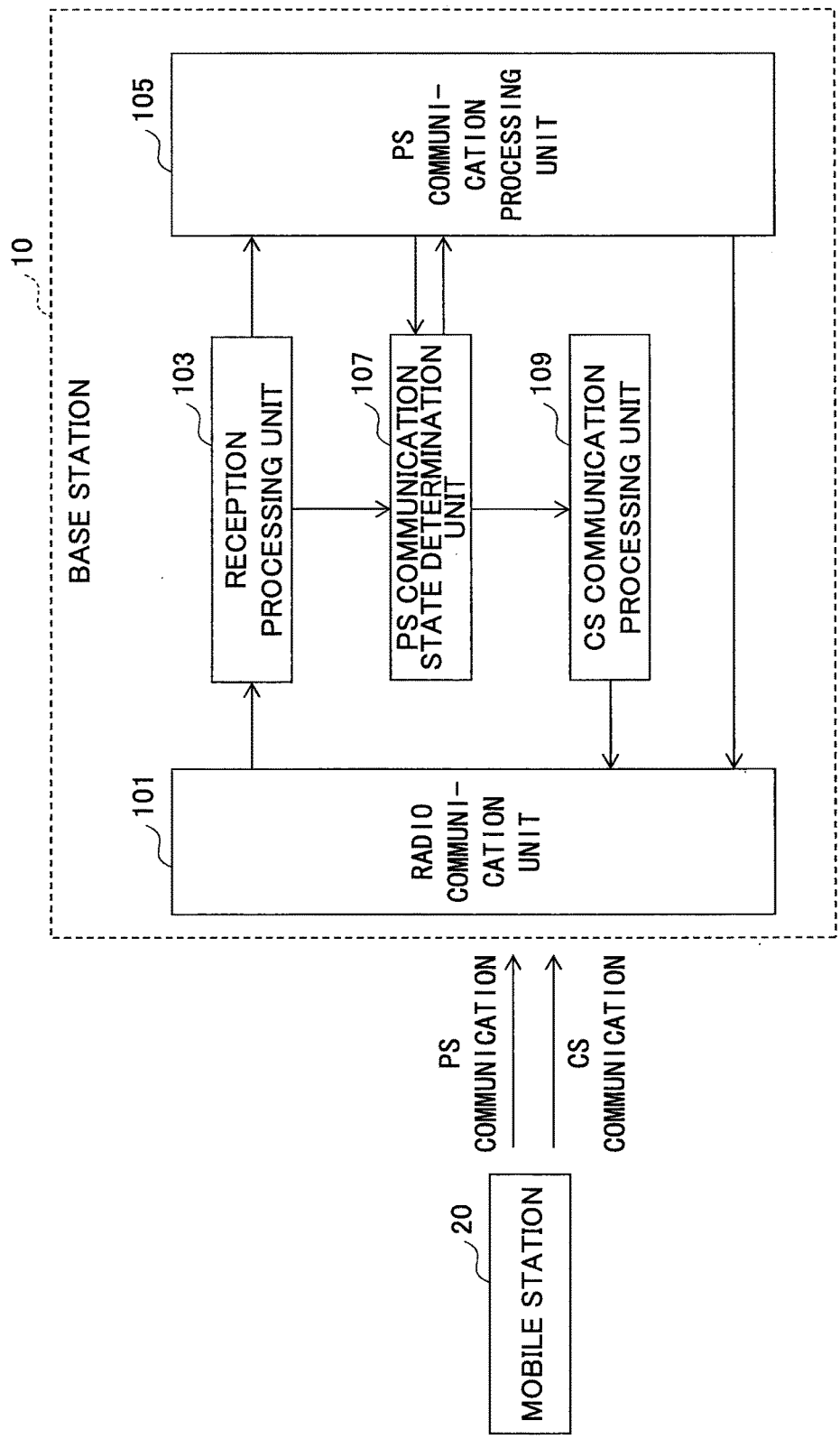
FIG. 2 shows a block diagram of a base station in accordance with an embodiment of the present invention.

FIG. 2 shows a block diagram of the base station 10 in accordance with an embodiment of the present invention. The base station 10 includes a radio communication unit 101, a reception processing unit 103, a PS communication processing unit 105, a PS communication state determination unit 107, and a CS communication processing unit 109.

The radio communication unit 101 is an interface for exchanging messages with the mobile station 20. When a voice call is originated from the mobile station 20, the radio communication unit 101 receives a call request for voice communication and transmits and receives messages for establishing a CS bearer between the base station 10 and the mobile station 20. When a voice call for the mobile station 20 is received, the radio communication unit 101 sends a paging to the mobile station 20, receives a paging response from the mobile station 20, and transmits and receives messages for establishing a CS bearer between the base station 10 and the mobile station 20.

The reception processing unit 103 divides received messages into a message for packet switched communication and a message for circuit switched communication, provides the message for packet switched communication to the PS communication processing unit 105, and provides the message for circuit switched communication to the CS communication processing unit 109.

The PS communication processing unit 105 performs processing for packet communication with the mobile station 20. Specifically, the PS communication processing unit 105 adds or deletes a PS bearer for packet communication with the mobile station 20. In addition, the PS communication processing unit 105 appropriately arranges data for mobile station 20 to be transmitted in a user plane (U-plane).

The PS communication state determination unit 107 manages a state of packet communication in the PS communication processing unit 105. Specifically, the PS communication state determination unit 107 determines whether no packet communication has been performed for a predetermined time period or more when a voice call is originated or when a voice call is received. Whether packet communication is performed may be specifically determined based on the amount of data in the user plane. If no packet communication has been performed for the predetermined time period or more when a voice call is originated or when a voice call is received, the PS communication state determination unit 107 instructs the CS communication processing unit 109 to use a radio parameter corresponding to a single bearer for circuit switched communication. On the other hand, if packet communication has been performed within the predetermined time period when a voice call is originated or when a voice call is received, the PS communication state determination unit 107 instructs the CS communication processing unit 107 to use a radio parameter for multi-calls. For example, a target signal power to interference power ratio (Target_SIR) may be used as the radio parameter. For example, when a Target_SIR is used as the radio parameter, for a mobile station in which no packet communication has been performed for the predetermined time period or more, the PS communication state determination unit 107 reduces the amount of allocation of the Target_SIR to the amount of allocation for a single bearer, rather than the amount of allocation for multi-calls.

In addition, the PS communication state determination unit 107 may instruct the PS communication processing unit 105 to delete the PS bearer when no packet communication has been performed for the predetermined time period or more since the establishment of the CS bearer.

The CS communication processing unit 109 performs processing for voice communication with the mobile station 20. Specifically, the CS communication processing unit 109 adds or deletes a CS bearer for voice communication with the mobile station 20.

<Operations in a Radio Communication System and a Base Station>

Figure 3:
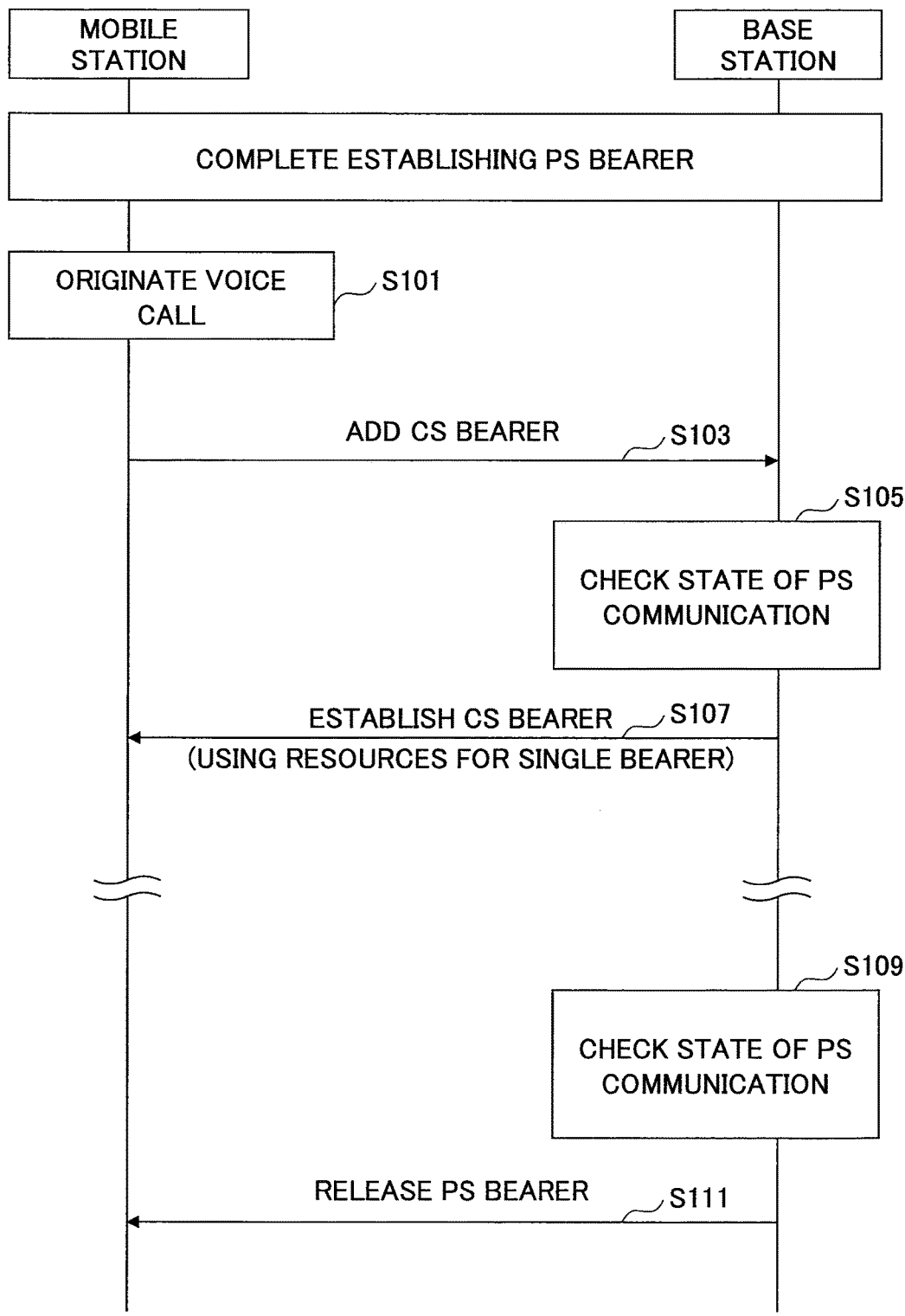
FIG. 3 shows a sequence diagram of a voice communication control method in a radio communication system in accordance with an embodiment of the present invention.

FIG. 3 shows a sequence diagram of a voice communication control method in a radio communication system in accordance with an embodiment of the present invention.

To begin with, it is assumed that a PS bearer is established between the mobile station 20 and the base station 10. When the mobile station 20 originates a voice call in this situation (S101), the mobile station 20 requests the base station 10 to add a CS bearer (S103).

The PS communication state determination unit 107 in the base station 10 determines whether no packet communication has been performed for a predetermined time period or more when the voice call is originated (S105). If no packet communication has been performed for the predetermined time period or more when the voice call is originated, the PS communication state determination unit 107 instructs the CS communication processing unit 109 to use a radio parameter corresponding to a single bearer for circuit switched communication. The CS communication processing unit 109 establishes a CS bearer using the radio parameter corresponding to a single bearer (S107).

The PS communication state determination unit 107 continues to check the state of PS communication after the establishment of the CS bearer (S109). When no packet communication has been performed for a predetermined time period or more since the establishment of the CS bearer using the radio parameter corresponding to a single bearer, the PS communication determination unit 107 may instruct the PS communication processing unit 105 to delete the PS bearer. The PS communication processing unit 105 instructs the mobile station 20 to release the PS bearer (S111).

Figure 4:
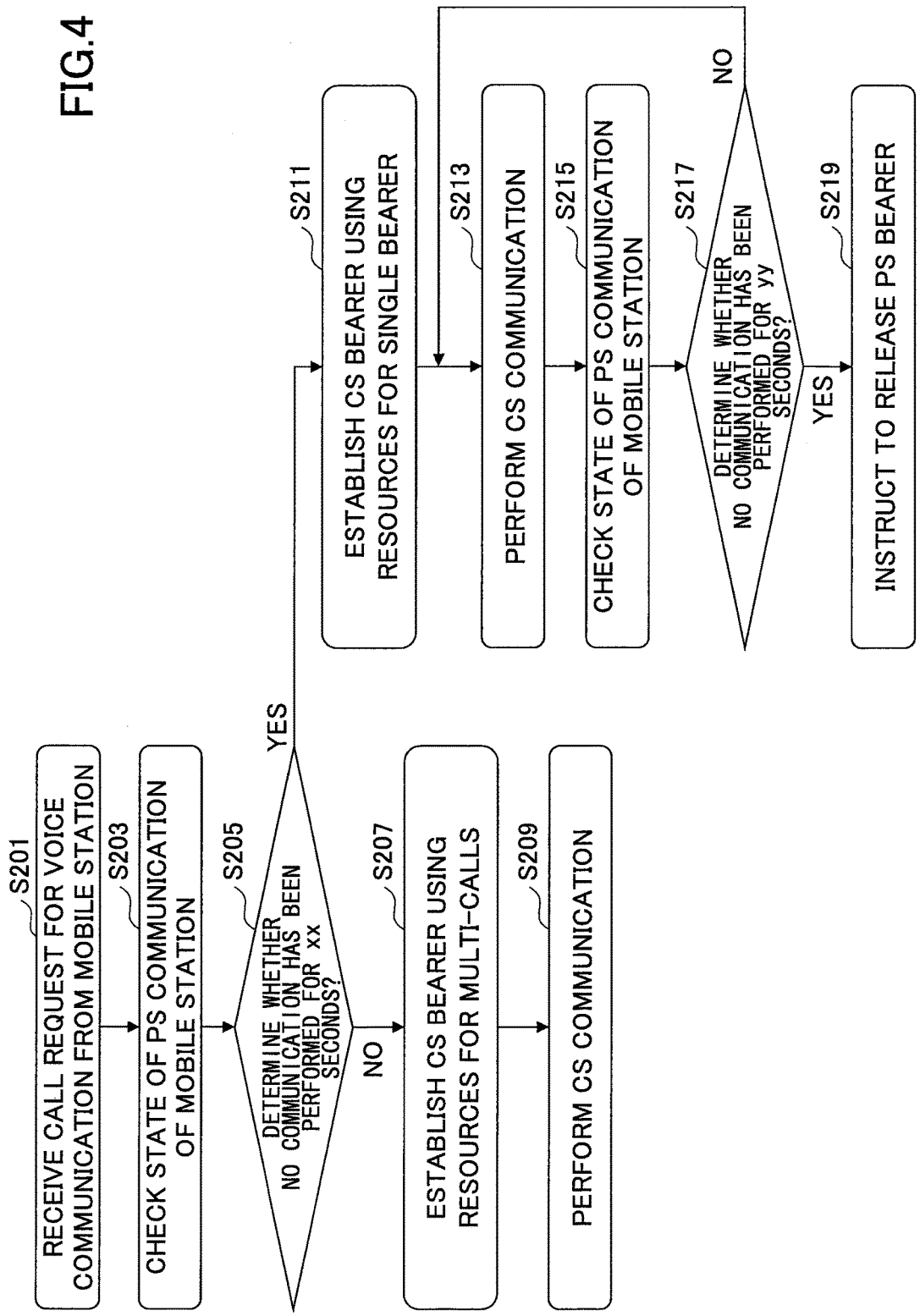
FIG. 4 shows a flowchart of a voice communication control method in a base station in accordance with an embodiment of the present invention.

FIG. 4 shows a flowchart of a voice communication control method in the base station 10 in accordance with an embodiment of the present invention. As a precondition of the voice communication control method shown in FIG. 4, it is assumed that a PS bearer is established between the mobile station 20 and the base station 10.

The radio communication unit 101 in the base station 10 receives a call request for voice communication from the mobile station 20 (S201).

Then, the PS communication state determination unit 107 checks the state of packet communication of the mobile station 20 (S203) and determines whether no packet communication has been performed for a predetermined time period (xx seconds) or more when a voice call is originated (S205).

If packet communication has been performed within the predetermined time period when a voice call is originated (S205: NO), the CS communication processing unit 109 establishes a CS bearer using a radio parameter for multi-calls (S207). Then, the CS communication processing unit 109 performs CS communication with the mobile station 20 (S209).

If no packet communication has been performed for the predetermined time period or more when a voice call is originated (S205: YES), the CS communication processing unit 109 establishes a CS bearer using a radio parameter corresponding to a single bearer (S211). Then, the CS communication processing unit 109 performs CS communication with the mobile station 20 (S213).

The PS communication state determination unit 107 continues to check the state of PS communication after the establishment of the CS bearer (S215). When no packet communication has been performed for a predetermined time period (yy seconds) or more since the establishment of the CS bearer using the radio parameter corresponding to a single bearer (S217: YES), the PS communication processing unit 105 instructs the mobile station 20 to release the PS bearer (S219).

While FIGS. 3 and 4 show the case where a voice call is originated, the same procedure can be applied to the case where a voice call is received. In the case where a voice call is received, a paging response (call response) is used instead of a call request for voice communication.

Effects of Embodiments of the Present Invention

According to an embodiment of the present invention, it is possible to save radio resources in a multi-call condition when no packet communication is performed.

Specifically, by using a radio parameter corresponding to a single bearer for circuit switched communication rather than a radio parameter for multi-calls, it is possible to save battery energy due to reduction of transmission power in a mobile station, to stabilize uplink quality due to reduction of uplink interference, and to save a channelization code in a base station.

In an embodiment of the present invention, since a PS bearer is not deleted when a voice call is originated or received, unnecessary control sequences are not involved.

In addition, when no packet communication has been performed for a predetermined time period or more since the establishment of the CS bearer, the CS bearer is deleted. By deleting the PS bearer, radio resources are further saved.

While the embodiments of the present invention have been described using a WCDMA system as an example, the present invention can be applied to any other system. In general, the present invention can be applied to a radio communication system which can simultaneously support voice communication according to circuit switching and data communication according to packet switching.

For convenience of explanation, the base station according to the embodiments of the present invention has been described with reference to a functional block diagram, but the base station may be implemented in hardware, software, or combinations thereof. In addition, two or more functional elements may be combined as appropriate. The method according to the embodiments of the present invention has been described with reference to flowcharts, but the method may be carried out in a different order from the order shown in the embodiments.

While the approaches are described above to save radio resources in a multi-call condition when no packet communication is performed, the present invention is not limited to the these embodiments, and variations, modifications, alterations, and substitutions can be made by those skilled in the art without deviating from the spirit of the present invention.

The present international application is based on and claims the benefit of priority of Japanese Patent Application No. 2013-093859 filed on Apr. 26, 2013, the entire contents of which are hereby incorporated by reference.

DESCRIPTION OF NOTATIONS

10 base station
20 mobile station
101 radio communication unit
103 reception processing unit
105 PS communication processing unit
107 PS communication state determination unit
109 CS communication processing unit

The invention claimed is:
1. A base station, comprising:
a reception unit configured to receive a call request or a paging response according to circuit switching from a mobile station while a packet switched bearer is established;
a packet switched communication state determination unit configured to determine a state of packet switched communication of the mobile station, when the call request or the paging response is received from the mobile station; and
a circuit switching communication processing unit configured to
establish a circuit switched bearer using a radio parameter for circuit switched communication, when no packet switched communication is performed in the mobile station; and
establish the circuit switched bearer using a radio parameter for both circuit switched and packet switched communication, when packet switched communication is performed in the mobile station.

2. The base station as claimed in claim 1, further comprising:
a packet switched communication processing unit configured to delete the packet switched bearer when no packet switched communication has been performed for a first predetermined time period or more since the establishment of the circuit switched bearer.

3. The base station as claimed in claim 1, wherein
the packet switched communication state determination unit determines whether no packet switched communication has been performed in a user plane for a second predetermined time period or more, when the call request or the paging response is received from the mobile station.

4. A communication control method in a base station, comprising:
receiving a call request or a paging response according to circuit switching from a mobile station while a packet switched bearer is established;
determining a state of packet switched communication of the mobile station, when the call request or the paging response is received from the mobile station; and
establishing a circuit switched bearer using a radio parameter for circuit switched communication, when no packet switched communication is performed in the mobile station, and establishing the circuit switched bearer using a radio parameter for both circuit switched and packet switched communication, when packet switched communication is performed in the mobile station.

5. A base station, comprising:
a receiver configured to receive a call request or a paging response according to circuit switching from a mobile station while a packet switched bearer is established; and
circuitry configured to
determine a state of packet switched communication of the mobile station, when the call request or the paging response is received from the mobile station;
establish a circuit switched bearer using a radio parameter for circuit switched communication, when no packet switched communication is performed in the mobile station; and
establish the circuit switched bearer using a radio parameter for both circuit switched and packet switched communication, when packet switched communication is performed in the mobile station.

6. The base station as claimed in claim 5, wherein
the circuitry is configured to delete the packet switched bearer when no packet switched communication has been performed for a first predetermined time period or more since the establishment of the circuit switched bearer.

7. The base station as claimed in claim 5, wherein
the circuitry is configured to determine whether no packet switched communication has been performed in a user plane for a second predetermined time period or more, when the call request or the paging response is received from the mobile station.

* * * * *